US00RE43832E

(19) United States
(12) Reissued Patent
Malloy et al.

(10) Patent Number: US RE43,832 E
(45) Date of Reissued Patent: Nov. 27, 2012

(54) CONSTANT FORCE COAXIAL CABLE CONNECTOR

(75) Inventors: Allen L. Malloy, Elmira Heights, NY (US); Jack Radzik, Trumansburg, NY (US); Mike Dean, Waverly, NY (US); Bruce C. Hauver, Elmira, NY (US); Gary A. Knaus, Horseheads, NY (US); Charles Thomas, Athens, PA (US)

(73) Assignee: Belden Inc., St. Louis, MO (US)

(21) Appl. No.: 13/192,393

(22) Filed: Jul. 27, 2011

Related U.S. Patent Documents

Reissue of:
(64) Patent No.: 7,566,236
Issued: Jul. 28, 2009
Appl. No.: 12/156,970
Filed: Jun. 5, 2008

U.S. Applications:
(60) Provisional application No. 60/943,943, filed on Jun. 14, 2007.

(51) Int. Cl.
*H01R 9/05* (2006.01)

(52) U.S. Cl. ..... 439/321; 439/585

(58) Field of Classification Search ..... 439/321, 439/578–585
See application file for complete search history.

(56) References Cited

U.S. PATENT DOCUMENTS

| | | | |
|---|---|---|---|
| 1,667,485 | A | 4/1928 | MacDonald |
| 2,258,737 | A | 10/1941 | Browne |
| 2,544,654 | A | 3/1951 | Browne |
| 2,549,647 | A | 4/1951 | Turenne |
| 2,694,187 | A | 11/1954 | Nash |
| 2,754,487 | A | 7/1956 | Carr et al. |
| 2,757,351 | A | 7/1956 | Klostermann |
| 2,805,399 | A | 9/1957 | Leeper |
| 2,870,420 | A | 1/1959 | Malek |
| 3,184,706 | A | 5/1965 | Atkins |
| 3,196,382 | A | 7/1965 | Morello, Jr. |
| 3,245,027 | A | 4/1966 | Ziegler, Jr. |
| 3,275,913 | A | 9/1966 | Blanchard et al. |
| 3,292,136 | A | 12/1966 | Somerset |
| 3,320,575 | A | 5/1967 | Brown et al. |
| 3,350,677 | A | 10/1967 | Daum |
| 3,355,698 | A | 11/1967 | Keller |
| 3,373,243 | A | 3/1968 | Janowiak et al. |

(Continued)

FOREIGN PATENT DOCUMENTS

| | | |
|---|---|---|
| CA | 2096710 | 11/1994 |

(Continued)

*Primary Examiner* — Gary F. Paumen
(74) *Attorney, Agent, or Firm* — Foley & Lardner LLP

(57) ABSTRACT

A coaxial cable connector generally includes a connector body, a nut rotatably coupled to the connector body, a post disposed in the connector body and a biasing element acting between the post and the nut. The nut has an internal thread for engagement with an external thread of a mating connector. The internal thread of the nut and the external thread of the mating connector can be mismatched, wherein an interference fit is created therebetween upon connection of the nut to the mating connector. Also, the post can have a forward flanged base portion disposed within the axial length of the internally threaded surface of the nut, which, together with the biasing element, provides a constant force between the post and the nut.

35 Claims, 4 Drawing Sheets

U.S. PATENT DOCUMENTS

| | | | |
|---|---|---|---|
| 3,406,373 | A | 10/1968 | Forney, Jr. |
| 3,448,430 | A | 6/1969 | Kelly |
| 3,465,281 | A | 9/1969 | Florer |
| 3,475,545 | A | 10/1969 | Stark et al. |
| 3,498,647 | A | 3/1970 | Schroder |
| 3,517,373 | A | 6/1970 | Jamon |
| 3,533,051 | A | 10/1970 | Ziegler, Jr. |
| 3,537,065 | A | 10/1970 | Winston |
| 3,544,705 | A | 12/1970 | Winston |
| 3,551,882 | A | 12/1970 | O'Keefe |
| 3,564,487 | A | 2/1971 | Upstone et al. |
| 3,629,792 | A | 12/1971 | Dorrell |
| 3,633,150 | A | 1/1972 | Swartz |
| 3,663,926 | A | 5/1972 | Brandt |
| 3,668,612 | A | 6/1972 | Nepovim |
| 3,671,922 | A | 6/1972 | Zerlin et al. |
| 3,694,792 | A | 9/1972 | Wallo |
| 3,710,005 | A | 1/1973 | French |
| 3,778,535 | A | 12/1973 | Forney, Jr. |
| 3,781,762 | A | 12/1973 | Quackenbush |
| 3,808,580 | A | 4/1974 | Johnson |
| 3,836,700 | A | 9/1974 | Niemeyer |
| 3,845,453 | A | 10/1974 | Hemmer |
| 3,846,738 | A | 11/1974 | Nepovim |
| 3,854,003 | A | 12/1974 | Duret |
| 3,879,102 | A | 4/1975 | Horak |
| 3,907,399 | A | 9/1975 | Spinner |
| 3,910,673 | A | 10/1975 | Stokes |
| 3,915,539 | A | 10/1975 | Collins |
| 3,936,132 | A | 2/1976 | Hutter |
| 3,963,320 | A | 6/1976 | Spinner |
| 3,972,013 | A | 7/1976 | Shapiro |
| 3,976,352 | A | 8/1976 | Spinner |
| 3,980,805 | A | 9/1976 | Lipari |
| 3,985,418 | A | 10/1976 | Spinner |
| 4,046,451 | A | 9/1977 | Juds et al. |
| 4,053,200 | A | 10/1977 | Pugner |
| 4,059,330 | A | 11/1977 | Shirey |
| 4,093,335 | A | 6/1978 | Schwartz et al. |
| 4,126,372 | A | 11/1978 | Hashimoto et al. |
| 4,131,332 | A | 12/1978 | Hogendobler et al. |
| 4,150,250 | A | 4/1979 | Lundeberg |
| 4,156,554 | A | 5/1979 | Aujla |
| 4,165,554 | A | 8/1979 | Faget |
| 4,165,911 | A | 8/1979 | Laudig |
| 4,168,921 | A | 9/1979 | Blanchard |
| 4,173,385 | A | 11/1979 | Fenn et al. |
| 4,225,162 | A | 9/1980 | Dola |
| 4,227,765 | A | 10/1980 | Neumann et al. |
| 4,250,348 | A | 2/1981 | Kitagawa |
| 4,280,749 | A | 7/1981 | Hemmer |
| 4,339,166 | A | 7/1982 | Dayton |
| 4,346,958 | A | 8/1982 | Blanchard |
| 4,354,721 | A | 10/1982 | Luzzi |
| 4,358,174 | A | 11/1982 | Dreyer |
| 4,373,767 | A | 2/1983 | Cairns |
| 4,400,050 | A | 8/1983 | Hayward |
| 4,407,529 | A | 10/1983 | Holman |
| 4,408,821 | A | 10/1983 | Forney, Jr. |
| 4,408,822 | A | 10/1983 | Nikitas |
| 4,421,377 | A | 12/1983 | Spinner |
| 4,444,453 | A | 4/1984 | Kirby et al. |
| 4,456,323 | A | 6/1984 | Pitcher et al. |
| 4,462,653 | A | 7/1984 | Flederbach et al. |
| 4,464,000 | A | 8/1984 | Werth et al. |
| 4,484,792 | A | 11/1984 | Tengler et al. |
| 4,515,427 | A | 5/1985 | Smit |
| 4,533,191 | A | 8/1985 | Blackwood |
| 4,540,231 | A | 9/1985 | Forney, Jr. |
| 4,545,637 | A | 10/1985 | Bosshard et al. |
| 4,575,274 | A | 3/1986 | Hayward |
| 4,583,811 | A | 4/1986 | McMills |
| 4,588,246 | A | 5/1986 | Schildkraut et al. |
| 4,593,964 | A | 6/1986 | Forney et al. |
| 4,596,434 | A | 6/1986 | Saba et al. |
| 4,596,435 | A | 6/1986 | Bickford |
| 4,598,961 | A | 7/1986 | Cohen |
| 4,600,263 | A | 7/1986 | DeChamp et al. |
| 4,614,390 | A | 9/1986 | Baker |
| 4,632,487 | A | 12/1986 | Wargula |
| 4,640,572 | A | 2/1987 | Conlon |
| 4,645,281 | A | 2/1987 | Burger |
| 4,650,228 | A | 3/1987 | McMills et al. |
| 4,655,159 | A | 4/1987 | McMills |
| 4,660,921 | A | 4/1987 | Hauver |
| 4,668,043 | A | 5/1987 | Saba et al. |
| 4,674,818 | A | 6/1987 | McMills et al. |
| 4,676,577 | A | 6/1987 | Szegda |
| 4,682,832 | A | 7/1987 | Punako et al. |
| 4,688,876 | A | 8/1987 | Morelli |
| 4,688,878 | A | 8/1987 | Cohen et al. |
| 4,691,976 | A | 9/1987 | Cowen |
| 4,703,987 | A | 11/1987 | Gallusser et al. |
| 4,703,988 | A | 11/1987 | Raux et al. |
| 4,717,355 | A | 1/1988 | Mattis |
| 4,738,009 | A | 4/1988 | Down et al. |
| 4,746,305 | A | 5/1988 | Nomura |
| 4,747,786 | A | 5/1988 | Hayashi et al. |
| 4,755,152 | A | 7/1988 | Elliot et al. |
| 4,759,729 | A | 7/1988 | Kemppainen et al. |
| 4,761,146 | A | 8/1988 | Sohoel |
| 4,772,222 | A | 9/1988 | Laudig et al. |
| 4,789,355 | A | 12/1988 | Lee |
| 4,806,116 | A | 2/1989 | Ackerman |
| 4,813,886 | A | 3/1989 | Roos et al. |
| 4,820,185 | A | 4/1989 | Moulin |
| 4,834,675 | A | 5/1989 | Samchisen |
| 4,854,893 | A | 8/1989 | Morris |
| 4,857,014 | A | 8/1989 | Alf et al. |
| 4,869,679 | A | 9/1989 | Szegda |
| 4,874,331 | A | 10/1989 | Iverson |
| 4,892,275 | A | 1/1990 | Szegda |
| 4,902,246 | A | 2/1990 | Samchisen |
| 4,906,207 | A | 3/1990 | Banning et al. |
| 4,915,651 | A | 4/1990 | Bout |
| 4,923,412 | A | 5/1990 | Morris |
| 4,925,403 | A | 5/1990 | Zorzy |
| 4,927,385 | A | 5/1990 | Cheng |
| 4,929,188 | A | 5/1990 | Lionetto et al. |
| 4,952,174 | A | 8/1990 | Sucht et al. |
| 4,957,456 | A | 9/1990 | Olson et al. |
| 4,973,265 | A | 11/1990 | Heeren |
| 4,979,911 | A | 12/1990 | Spencer |
| 4,990,104 | A | 2/1991 | Schieferly |
| 4,990,105 | A | 2/1991 | Karlovich |
| 4,990,106 | A | 2/1991 | Szegda |
| 4,992,061 | A | 2/1991 | Brush et al. |
| 5,002,503 | A | 3/1991 | Campbell et al. |
| 5,007,861 | A | 4/1991 | Stirling |
| 5,021,010 | A | 6/1991 | Wright |
| 5,024,606 | A | 6/1991 | Ming-Hwa |
| 5,037,328 | A | 8/1991 | Karlovich |
| 5,062,804 | A | 11/1991 | Jamet et al. |
| 5,066,248 | A | 11/1991 | Gaver et al. |
| 5,073,129 | A | 12/1991 | Szegda |
| 5,083,943 | A | 1/1992 | Tarrant |
| 5,120,260 | A | 6/1992 | Jackson |
| 5,127,853 | A | 7/1992 | McMills et al. |
| 5,131,862 | A | 7/1992 | Gershfeld |
| 5,141,451 | A | 8/1992 | Down |
| 5,161,993 | A | 11/1992 | Leibfried, Jr. |
| 5,195,906 | A | 3/1993 | Szegda |
| 5,205,761 | A | 4/1993 | Nilsson |
| 5,207,602 | A | 5/1993 | McMills et al. |
| 5,217,391 | A | 6/1993 | Fisher, Jr. |
| 5,217,393 | A | 6/1993 | Del Negro et al. |
| 5,269,701 | A | 12/1993 | Leibfried, Jr. |
| 5,283,853 | A | 2/1994 | Szegda |
| 5,284,449 | A | 2/1994 | Vaccaro |
| 5,295,864 | A | 3/1994 | Birch et al. |
| 5,316,494 | A | 5/1994 | Flanagan et al. |
| 5,318,459 | A | 6/1994 | Shields |
| 5,338,225 | A | 8/1994 | Jacobsen et al. |
| 5,342,218 | A | 8/1994 | McMills et al. |
| 5,354,217 | A | 10/1994 | Gabel et al. |
| 5,371,819 | A | 12/1994 | Szegda |
| 5,371,821 | A | 12/1994 | Szegda |

| | | | |
|---|---|---|---|
| 5,371,827 | A | 12/1994 | Szegda |
| 5,393,244 | A | 2/1995 | Szegda |
| 5,431,583 | A | 7/1995 | Szegda |
| 5,435,745 | A | 7/1995 | Booth |
| 5,444,810 | A | 8/1995 | Szegda |
| 5,455,548 | A | 10/1995 | Grandchamp et al. |
| 5,456,611 | A | 10/1995 | Henry et al. |
| 5,456,614 | A | 10/1995 | Szegda |
| 5,466,173 | A | 11/1995 | Down |
| 5,470,257 | A | 11/1995 | Szegda |
| 5,494,454 | A | 2/1996 | Johnsen |
| 5,501,616 | A | 3/1996 | Holliday |
| 5,525,076 | A | 6/1996 | Down |
| 5,542,861 | A | 8/1996 | Anhalt et al. |
| 5,548,088 | A | 8/1996 | Gray et al. |
| 5,550,521 | A | 8/1996 | Bernaud et al. |
| 5,571,028 | A | 11/1996 | Szegda |
| 5,586,910 | A | 12/1996 | Del Negro et al. |
| 5,598,132 | A | 1/1997 | Stabile |
| 5,607,325 | A | 3/1997 | Toma |
| 5,620,339 | A | 4/1997 | Gray et al. |
| 5,632,651 | A | 5/1997 | Szegda |
| 5,651,699 | A | 7/1997 | Holliday |
| 5,653,605 | A | 8/1997 | Woehl et al. |
| 5,667,405 | A | 9/1997 | Holliday |
| 5,702,263 | A | 12/1997 | Baumann et al. |
| 5,769,652 | A | 6/1998 | Wider |
| 5,775,927 | A | 7/1998 | Wider |
| 5,863,220 | A | 1/1999 | Holliday |
| 5,879,191 | A | 3/1999 | Burris |
| 5,882,226 | A | 3/1999 | Bell et al. |
| 5,967,852 | A | 10/1999 | Follingstad et al. |
| 5,975,949 | A | 11/1999 | Holliday et al. |
| 5,975,951 | A | 11/1999 | Burris et al. |
| 5,997,350 | A | 12/1999 | Burris et al. |
| 6,032,358 | A | 3/2000 | Wild |
| 6,042,422 | A | 3/2000 | Youtsey |
| 6,089,903 | A | 7/2000 | Stafford Gray et al. |
| 6,089,912 | A | 7/2000 | Tallis et al. |
| 6,089,913 | A | 7/2000 | Holliday |
| 6,146,197 | A | 11/2000 | Holliday et al. |
| 6,152,753 | A | 11/2000 | Johnson et al. |
| 6,210,222 | B1 | 4/2001 | Langham et al. |
| 6,217,383 | B1 | 4/2001 | Holland et al. |
| 6,241,553 | B1 | 6/2001 | Hsia |
| 6,261,126 | B1 | 7/2001 | Stirling |
| 6,358,077 | B1 | 3/2002 | Young |
| D458,904 | S | 6/2002 | Montena |
| D460,739 | S | 7/2002 | Fox |
| D460,740 | S | 7/2002 | Montena |
| D460,946 | S | 7/2002 | Montena |
| D460,947 | S | 7/2002 | Montena |
| D460,948 | S | 7/2002 | Montena |
| 6,425,782 | B1 | 7/2002 | Holland |
| D461,166 | S | 8/2002 | Montena |
| D461,167 | S | 8/2002 | Montena |
| D461,778 | S | 8/2002 | Fox |
| D462,058 | S | 8/2002 | Montena |
| D462,060 | S | 8/2002 | Fox |
| D462,327 | S | 9/2002 | Montena |
| 6,491,546 | B1 | 12/2002 | Perry |
| D468,696 | S | 1/2003 | Montena |
| 6,530,807 | B2 | 3/2003 | Rodrigues et al. |
| 6,558,194 | B2 | 5/2003 | Montena |
| 6,712,631 | B1 | 3/2004 | Youtsey |
| 6,716,062 | B1 | 4/2004 | Palinkas et al. |
| 6,733,337 | B2 | 5/2004 | Kodaira |
| 6,767,248 | B1 | 7/2004 | Hung |
| 6,805,584 | B1 | 10/2004 | Chen |
| 6,817,896 | B2 | 11/2004 | Derenthal |
| 6,848,940 | B2 | 2/2005 | Montena |
| 6,939,169 | B2 | 9/2005 | Islam et al. |
| 7,114,990 | B2 | 10/2006 | Bence et al. |
| 7,892,024 | B1 * | 2/2011 | Chen ..... 439/578 |
| 2002/0013088 | A1 | 1/2002 | Rodrigues et al. |
| 2004/0077215 | A1 | 4/2004 | Palinkas et al. |
| 2004/0102089 | A1 | 5/2004 | Chee |
| 2004/0229504 | A1 | 11/2004 | Liu |
| 2005/0042919 | A1 | 2/2005 | Montena |
| 2005/0208827 | A1 | 9/2005 | Burris et al. |
| 2010/0081321 | A1 * | 4/2010 | Malloy et al. ..... 439/578 |
| 2010/0081322 | A1 * | 4/2010 | Malloy et al. ..... 439/578 |
| 2010/0255721 | A1 * | 10/2010 | Purdy et al. ..... 439/583 |
| 2011/0111623 | A1 * | 5/2011 | Burris et al. ..... 439/578 |
| 2011/0117774 | A1 * | 5/2011 | Malloy et al. ..... 439/578 |

FOREIGN PATENT DOCUMENTS

| | | | |
|---|---|---|---|
| CA | 2096710 | A | 11/1994 |
| DE | 47 931 | | 10/1888 |
| DE | 1 02 289 | | 7/1897 |
| DE | 11 17 687 | | 11/1961 |
| DE | 1 515 398 | | 11/1962 |
| DE | 1 191 880 | | 4/1965 |
| DE | 11 91 880 | | 4/1965 |
| DE | 15 15 398 | | 4/1970 |
| DE | 2 221 936 | | 5/1972 |
| DE | 2 225 764 | | 5/1972 |
| DE | 2 261 973 | | 12/1972 |
| DE | 22 25 764 | | 12/1972 |
| DE | 22 21 936 | | 11/1973 |
| DE | 2 261 973 | | 6/1974 |
| DE | 32 11 008 | | 10/1983 |
| DE | 32 11 008 | A1 | 10/1983 |
| EP | 0 072 104 | B1 | 2/1983 |
| EP | 0 116 157 | | 8/1984 |
| EP | 0 116 157 | A1 | 8/1984 |
| EP | 0 167 738 | | 1/1986 |
| EP | 0 167 738 | A2 | 1/1986 |
| EP | 0072104 | | 1/1986 |
| EP | 0 265 276 | | 4/1988 |
| EP | 0 265 276 | B1 | 4/1988 |
| FR | 2 234 680 | | 6/1974 |
| FR | 2232846 | | 1/1975 |
| FR | 2234680 | | 1/1975 |
| FR | 2 462 798 | | 2/1981 |
| FR | 2462798 | | 2/1981 |
| FR | 2494508 | | 5/1982 |
| GB | 0 589 697 | | 3/1945 |
| GB | 1 087 228 | | 10/1967 |
| GB | 1 270 846 | | 4/1972 |
| GB | 2 019 665 | | 10/1979 |
| GB | 2019 665 | A | 10/1979 |
| GB | 2 079 549 | | 1/1982 |
| GB | 2 079 549 | A | 1/1982 |
| GB | 2079 549 | A | 1/1982 |
| GB | 2 331 634 | | 5/1999 |
| GB | 2331634 | A | 5/1999 |
| JP | 3280369 | | 3/1990 |
| JP | 3280369 | | 12/1991 |
| TW | 305417 | | 5/1997 |
| TW | 579079 | | 3/2004 |
| TW | 262638 | | 9/2006 |
| WO | WO 93/24973 | | 12/1991 |
| WO | WO-93/24973 | | 12/1993 |
| WO | WO-96/08854 | | 3/1996 |
| WO | WO-01/86756 | | 11/2001 |

* cited by examiner 10
12
14
18
20
22
30
44
54
56
58
L
52
50
a
b
c
32
28
34
36
26
24
42
16
40
46
62
64
38
58c
58b
58a
68
66
69
67
A

CONSTANT FORCE COAXIAL CABLE CONNECTOR

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of U.S. Provisional Application No. 60/943,943, filed on Jun. 14, 2007, which is incorporated by reference herein in its entirety for all purposes.

BACKGROUND OF THE INVENTION

The present invention relates generally to connectors for terminating coaxial cable. More particularly, the present invention relates to a coaxial cable connector having structural features to positively secure the connector to any F port regardless of the type of material, casting or plating specifications.

It has long been known to use connectors to terminate coaxial cable so as to connect a cable to various electronic devices such as televisions, radios and the like. Prior art coaxial connectors generally include a connector body having an annular collar for accommodating a coaxial cable, an annular nut rotatably coupled to the collar for providing mechanical attachment of the connector to an external device and an annular post interposed between the collar and the nut. A resilient sealing O-ring may also be positioned between the collar and the nut at the rotatable juncture thereof to provide a water resistant seal thereat. The collar includes a cable receiving end for insertably receiving an inserted coaxial cable and, at the opposite end of the connector body, the nut includes an internally threaded end extent permitting screw threaded attachment of the body to an external device.

This type of coaxial connector further typically includes a locking sleeve to secure the cable within the body of the coaxial connector. The locking sleeve, which is typically formed of a resilient plastic, is securable to the connector body to secure the coaxial connector thereto. In this regard, the connector body typically includes some form of structure to cooperatively engage the locking sleeve. Such structure may include one or more recesses or detents formed on an inner annular surface of the connector body, which engages cooperating structure formed on an outer surface of the sleeve. A coaxial cable connector of this type is shown and described in commonly owned U.S. Pat. No. 6,530,807.

Conventional coaxial cables typically include a center conductor surrounded by an insulator. A conductive foil is disposed over the insulator and a braided conductive shield surrounds the foil covered insulator. An outer insulative jacket surrounds the shield. In order to prepare the coaxial cable for termination, the outer jacket is stripped back exposing an extent of the braided conductive shield which is folded back over the jacket. A portion of the insulator covered by the conductive foil extends outwardly from the jacket and an extent of the center conductor extends outwardly from within the insulator.

Upon assembly, a coaxial cable is inserted into the cable receiving end of the connector body, wherein the annular post is forced between the foil covered insulator and the conductive shield of the cable. In this regard, the post is typically provided with a radially enlarged barb to facilitate expansion of the cable jacket. The locking sleeve is then moved axially into the connector body to clamp the cable jacket against the post barb providing both cable retention and a water-tight seal around the cable jacket. The connector can then be attached to an external device by tightening the internally threaded nut to an externally threaded terminal or port of the external device.

One problem with such prior art connectors is the connector's tendency over time to become disconnected from the external device to which it is connected. Specifically, the internally threaded nut for providing mechanical attachment of the connector to an external device has a tendency to back-off or loosen itself from the threaded port connection of the external device over time. Once the connector becomes sufficiently loosened, electrical connection between the coaxial cable and the external device is broken, resulting in a failed condition.

It is, therefore, desirable to provide a coaxial connector with structural features to enhance retaining of the connector nut to a threaded port of an external device and to minimize the nut's tendency to back-off or loosen itself from the port.

OBJECTS AND SUMMARY OF THE INVENTION

It is an object of the present invention to provide a coaxial cable connector for terminating a coaxial cable.

It is a further object of the present invention to provide a coaxial cable connector having structure to enhance retaining of the connector to any external device port regardless of the type of material, casting or plating specifications of the port.

In the efficient attainment of these and other objects, the present invention provides a coaxial cable connector. The connector of the present invention generally includes a connector body having a forward end and a rearward cable receiving end for receiving a cable and a nut rotatably coupled to the forward end of the connector body. The nut has an internal thread for engagement with an external thread of a mating connector. The internal thread of the nut and the external thread of the mating connector are mismatched, wherein an interference fit is created therebetween upon connection of the nut to the mating connector.

In a preferred embodiment, the internal thread of the nut is conically tapered over at least a portion of the thread length. In an alternative embodiment, the internal thread of the nut has a number of threads per unit length which is different than the number of threads per unit length provided on the external thread of the mating connector. In both embodiments, the coaxial cable connector further preferably includes an annular post disposed within the connector body and a biasing element acting between the post and the nut.

The present invention further involves a method for reducing the tendency of a coaxial cable connector to loosen itself from a device port. The method generally includes the steps of providing a device port with an external thread, providing a coaxial cable connector with a nut having an internal thread and connecting the connector nut with the device port by engaging the external thread of the port with the internal thread of the connector nut, wherein the internal thread of the nut and the external thread of the port are mismatched to create an interference fit therebetween.

The present invention further provides a coaxial cable connector including a connector body having a forward end and a rearward cable receiving end for receiving a cable, a nut rotatably coupled to the forward end of the connector body, an annular post disposed within the connector body and a biasing element acting between the post and the nut. The nut has an internally threaded surface for engagement with an external thread of a mating connector. The internally threaded surface has an axial length and the post has a forward flanged base portion disposed within the axial length of the internally threaded surface of the nut.

The nut preferably includes an internal radial flange having a forward facing wall and the flanged base portion of the post includes a rearward facing wall, wherein the forward facing wall of the nut radial flange and the rearward facing wall of the post flanged base portion define an annular chamber for receiving the biasing element. In a preferred embodiment, at least one thread of the nut threaded surface is disposed within the annular chamber rearward of the rearward facing wall of the post flanged base portion.

The post preferably includes a step formed on an outer surface thereof. The step engages a forward end of the connector body for positioning the post flanged base portion within the axial length of the internally threaded surface of the nut.

Also, the flanged base portion of the post preferably has a maximum outer diameter and the internally threaded surface of the nut has a minimal inner diameter. The maximum outer diameter of the post flanged base portion is smaller than the minimal inner diameter of the nut threaded surface, whereby the post flanged base portion is axially movable with respect to the internally threaded surface of the nut.

The present invention further involves a method for reducing the tendency of a coaxial cable connector to loosen itself from a device port. The method generally includes the step of connecting a connector nut, as described above, with a device port by rotating the nut in a first direction, thereby engaging an externally threaded surface of the port with the internally threaded surface of the connector nut, whereby a biasing element urges a forward facing wall of the post flanged base portion against a rearward facing wall of the port device, whereby the nut is permitted to rotate in a reverse direction up to three hundred sixty degrees before the forward facing wall of the post flanged base portion breaks contact with the rearward facing wall of the port device.

A preferred form of the coaxial connector, as well as other embodiments, objects, features and advantages of this invention, will be apparent from the following detailed description of illustrative embodiments thereof, which is to be read in conjunction with the accompanying drawings.

DETAILED DESCRIPTION OF THE PREFERRED EMBODIMENTS

Figures 1, 2:
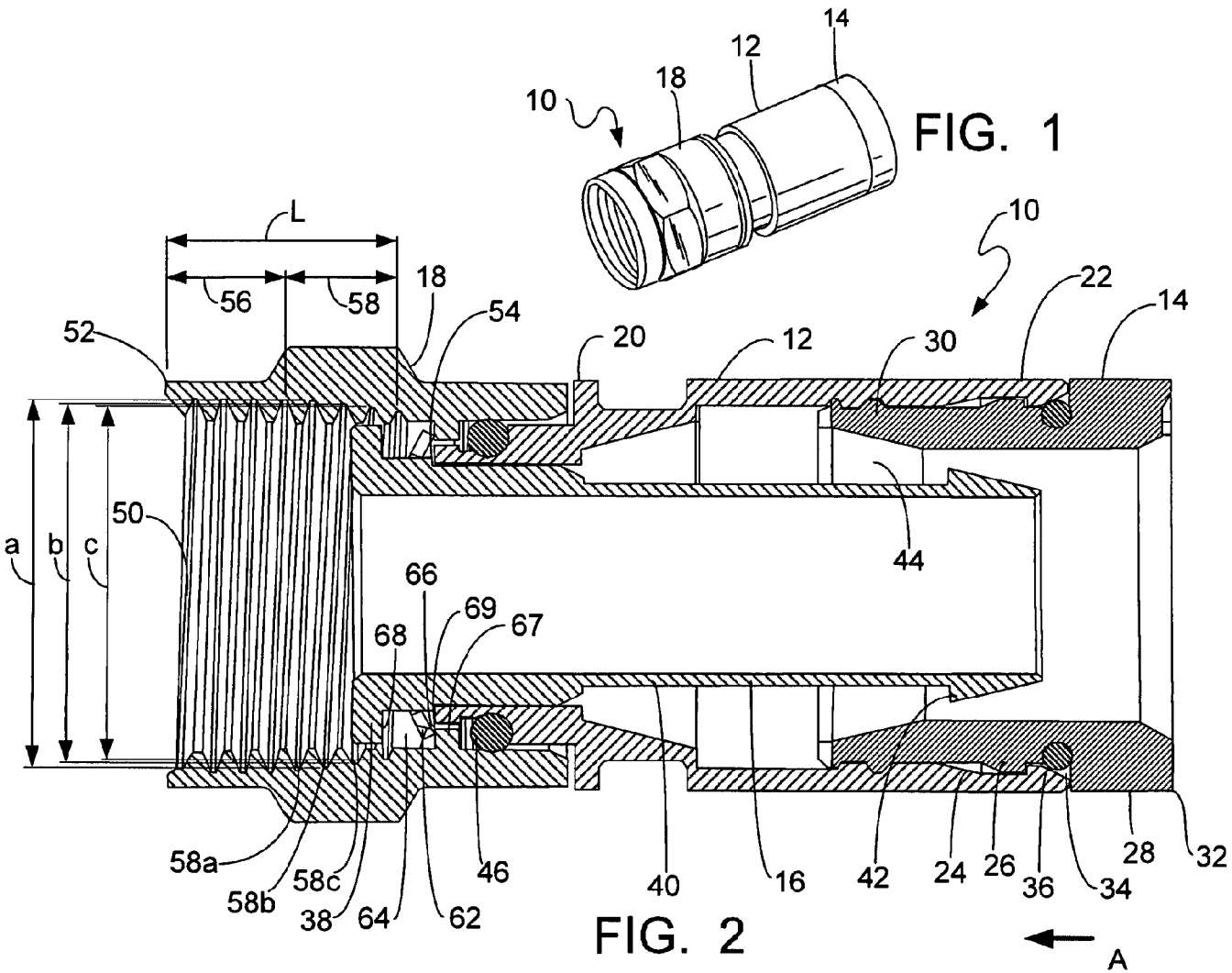
FIG. 1 is a top perspective view of a preferred embodiment of the coaxial cable connector of the present invention.
FIG. 2 is a cross-sectional view of the connector shown in FIG. 1.

Referring first to FIGS. 1 and 2, a preferred embodiment of the coaxial cable connector 10 of the present invention is shown. The connector 10 generally includes a connector body 12, a locking sleeve 14, an annular post 16 and a rotatable nut 18.

The connector body 12, also called a collar, is an elongate generally cylindrical member, which can be made from plastic or from metal or the like. The body 12 has a forward end 20 coupled to the post 16 and the nut 18 and an opposite cable receiving end 22 for insertably receiving the locking sleeve 14, as well as a prepared end of a coaxial cable in the forward direction as shown by arrow A. The cable receiving end 22 of the connector body 12 defines an inner sleeve engagement surface for coupling with the locking sleeve 14. The inner engagement surface is preferably formed with a groove or recess 24, which cooperates with mating detent structure 26 provided on the outer surface of the locking sleeve 14.

The locking sleeve 14 is a generally tubular member having a rearward cable receiving end 28 and an opposite forward connector insertion end 30, which is movably coupled to the inner surface of the connector body 12. As mentioned above, the outer cylindrical surface of the sleeve 14 includes a plurality of ridges or projections 26, which cooperate with the groove or recess 24 formed in the inner sleeve engagement surface of the connector body 12 to allow for the movable connection of the sleeve 14 to the connector body 12 such that the sleeve is lockingly axially moveable along arrow A toward the forward end 20 of the connector body from a first position, as shown for example in FIG. 5, which loosely retains the cable within the connector 10, to a more forward second position, as shown in FIG. 2, which secures the cable within the connector.

The locking sleeve 14 further preferably includes a flanged head portion 32 disposed at the rearward cable receiving end 28 thereof. The head portion 32 has an outer diameter larger than the inner diameter of the body 12 and includes a forward facing perpendicular wall 34, which serves as an abutment surface against which the rearward end of the body 12 stops to prevent further insertion of the sleeve 14 into the body 12. A resilient, sealing O-ring 36 is preferably provided at the forward facing perpendicular wall 34 to provide a water-tight seal between the locking sleeve 14 and the connector body 12 upon insertion of the locking sleeve within the body.

As mentioned above, the connector 10 of the present invention further includes an annular post 16 coupled to the forward end 20 of the connector body 12. The annular post 16 includes a flanged base portion 38 at its forward end for securing the post within the annular nut 18 and an annular tubular extension 40 extending rearwardly within the body 12 and terminating adjacent the rearward end 22 of the connector body 12. The rearward end of the tubular extension 40 preferably includes a radially outwardly extending ramped flange portion or "barb" 42 to enhance compression of the outer jacket of the coaxial cable to secure the cable within the connector 10. The tubular extension 40 of the post 16, the locking sleeve 14 and the body 12 define an annular chamber 44 for accommodating the jacket and shield of the inserted coaxial cable.

The connector 10 of the present invention further includes a nut 18 rotatably coupled to the forward end 20 of the connector body 12. The nut 18 may be in any external form, such as that of a hex nut, a knurled nut, a wing nut, or any other known attaching means, and is rotatably coupled to the connector body 12 for providing mechanical attachment of the connector 10 to an external device. A resilient sealing O-ring 46 is preferably positioned in the nut 18 to provide a water resistant seal between the connector body 12, the post 16 and the nut 18.

The connector 10 of the present invention is constructed so as to be supplied in the assembled condition shown in the drawings, wherein the locking sleeve 14 is pre-installed inside the rearward cable receiving end 22 of the connector body 12. In such assembled condition, a coaxial cable may be inserted through the rearward cable receiving end 28 of the sleeve ring 14 to engage the post 16 of the connector 10. However, it is conceivable that the locking sleeve 14 can be first slipped over the end of a cable and then be inserted into the rearward end 22 of the connector body 12 together with the cable.

In either case, once the prepared end of a cable is inserted into the connector body 12 so that the cable jacket is separated from the insulator by the sharp edge of the annular post 16, the locking sleeve 14 is moved axially forward in the direction of arrow A from the first position to the second position shown in FIG. 2. This may be accomplished with a suitable compression tool. As the sleeve 14 is moved axially forward, the cable jacket is compressed within the annular chamber 44 to secure the cable in the connector.

Once the cable is secured, the connector 10 is ready for attachment to a port connector 48, such as an F-81 connector, of an external device. Attachment of a conventional prior art coaxial cable connector to a port connector is typically achieved by providing the connector nut with an internal thread, which cooperatively matches an external thread formed on the port connector. The present invention enhances retention force between the nut and the port connector by providing the nut with an internal thread that does not match the standard external thread formed on the post connector. In this manner, an interference fit is provided between the internal thread of the nut and the external thread of the port connector, which resists "backing-off" or loosening of the nut even under vibration. Moreover, the interference fit between the threads further provides a seal against water migration.

Figure 3:
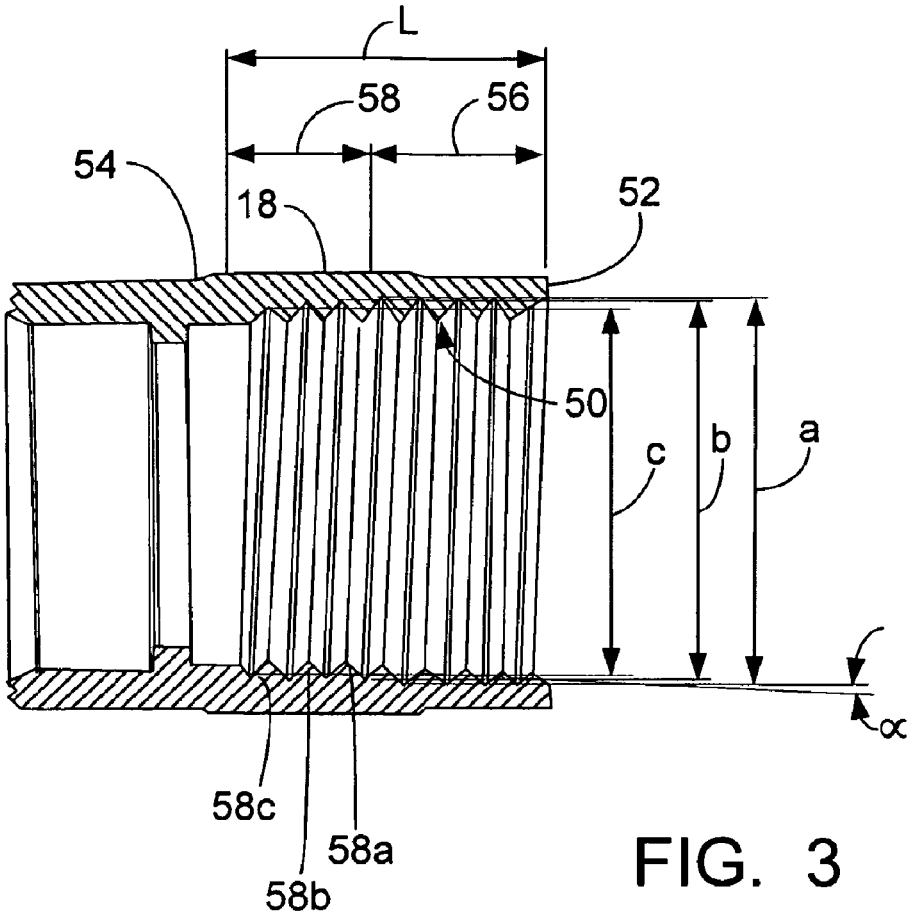
FIG. 3 is an enlarged cross-sectional view of the connector nut shown in FIGS. 1 and 2.
Figure 4:
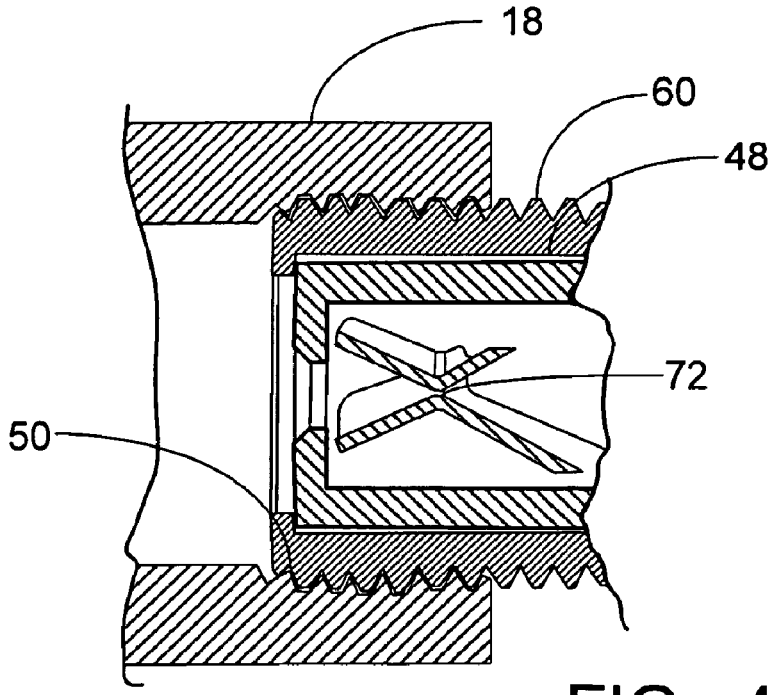
FIG. 4 is an enlarged cross-sectional view of the connector nut shown in FIGS. 1-3 engaging an external device port connector.

Specifically, in a preferred embodiment as shown in FIGS. 2-4, the nut 18 is formed with an internally threaded surface 50 whose pitch diameter conically tapers, or reduces in size, along at least a portion of the length L of the threaded surface. More particularly, the internal diameter of successive threads decreases in the rearward direction, opposite arrow A. Such taper can begin at the start of the threaded surface 50 at the forward end 52 of the nut and extend continuously to the inner-most bottom thread of the threaded surface at the rearward end of the nut.

However, in a preferred embodiment, the threaded surface 50 is formed with a straight forward portion 56, having threads with a constant pitch diameter, and a conically tapered rear portion 58, having threads with pitch diameters that successively decrease in the rearward direction, as shown in FIGS. 2-4. The straight portion 56 preferably extends roughly half the length (½ L) of the overall threaded surface. The straight portion 56 is provided, for example, with a standard ⅜-32 thread, which matches the standard external thread 60 formed on the port connector 48, as shown in FIG. 4. However, upon entering the tapered thread portion 58, the pitch diameter begins to decrease so that the diameter a of the first thread 58a of the tapered portion is less than the diameter of the threads in the straight portion 56, the diameter b of the second thread 58b of the tapered portion is less than the diameter a, the diameter c of the third thread 58c of the tapered portion is less than the diameter b, and so on.

The tapered rear portion 58 can have a taper angle $\alpha$ in the range of between ¼ and 5 degrees, as shown in FIG. 3. Best results have been found when the taper is formed at about 3 degrees. A 3 degree taper results in the first thread 58a of the tapered portion having a diameter a of about 0.375 inches, the second thread 58b of the tapered portion having a diameter b of about 0.371 inches and a third thread 58c of the tapered portion having a diameter c of about 0.368 inches. Of course, these pitch diameters are exemplary and other pitch diameters can be used with the present invention, so long as the pitch diameters gradually decrease in the rearward direction.

As can be seen in FIG. 4, by tapering the threads in the nut 18, an interference fit between the nut and the port connector 48 is created as the nut is threaded further onto the port connector. To properly retain the nut 18 on the port connector 48, and to prevent damage between the two as a result of over tightening, it is preferred to apply a known torque to the nut upon connection. Test results show that when applying, for example, a 30 inch-pound torque to the nut having the dimensions set forth above, the break-away torque for the nut was between 12 and 22 inch-pounds, depending on the type of material of the components.

Figure 5:
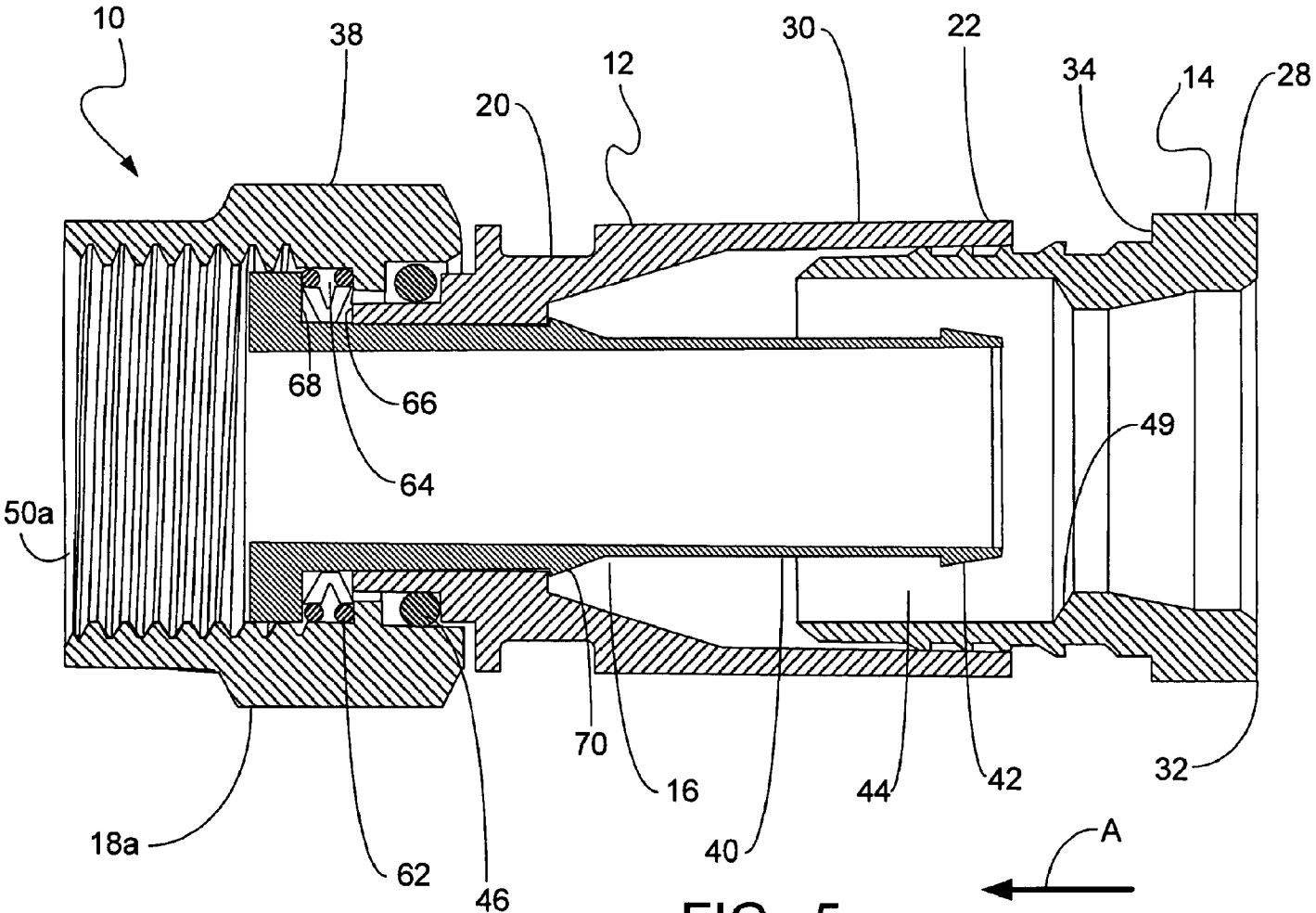
FIG. 5 is a cross-sectional view of an alternative embodiment of the coaxial cable connector of the present invention.
Figure 6:
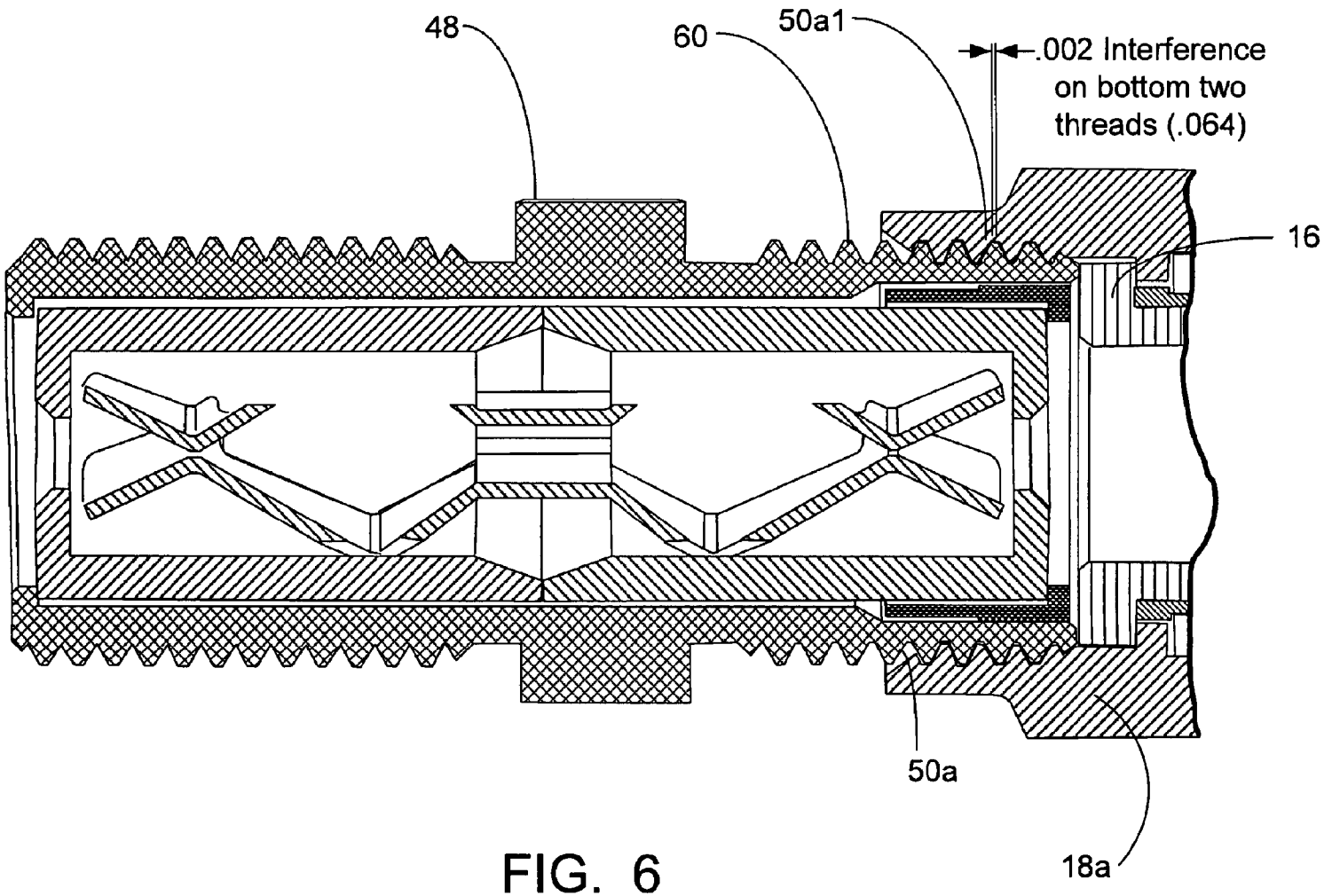
FIG. 6 is an enlarged cross-sectional view of the connector nut shown in FIG. 5 engaging an external device port connector.

Turning now to FIGS. 5 and 6, in an alternative embodiment, mismatching of the threads can be achieved by providing fewer threads per inch on the internal thread 50a of the nut 18a than the standard threads per inch formed on the external thread 60 of the port connector 48. Specifically, as discussed above, typical port connectors 48 are formed with a standard ⅜-32 external thread 60. This means that the external thread 60 has 32 threads per inch. Thus, by forming the internal thread 50a of the nut 18a with, for example, 30 threads per inch, an interference between the threads can be created. Using these values, it can be seen that an interference of 0.002 inches in the area 50a1 of the bottom, or rearward most, two threads (0.064) is created. Again, this interference results in the nut 18a resisting "backing-off" or loosening and provides a seal against water migration.

In both embodiments described above, the connector 10 of the present invention further includes a biasing element 62 acting between the post 16 and the nut 18, 18a for biasing the flanged base portion 38 of the post against the end face of the port connector 48. In particular, an annular chamber 64 is provided at the rearward, innermost end of the nut threaded surface 50, in which the biasing element 62 is received. The annular chamber 64 is defined at its rearward extent by a forward facing wall 66 of an inward radial flange 67 of the nut 18 and the forward facing end 69 of the connector body 12. At its forward extent, the annular chamber 64 is defined by a rearward facing wall 68 of the flanged base portion 38 of the post 18.

The annular chamber 64 can be provided by forming a step 54 on the outer surface of the post 16, which engages the forward end 20 of the connector body 12 and acts as an abutment flange to prevent further rearward insertion of the post 16 into the connector body 12 during manufacture. The step 54 is spaced from the flanged base portion 38 of the post 16 a sufficient distance so that, when the nut 18 is coupled to the connector body 12, the flanged base portion 38 will be positioned within the rear portion 58 of the nut threaded surface 50. Specifically, with the nut 18 having an inner threaded surface 50 having a length L, the flanged base portion 38 of the post is positioned within the rearward portion 58 of the length, and preferably within the rearward-most one-third extent of the length (⅓ L). Thus, the flanged base portion 38 of the post 16 is preferably positioned within the nut 18, relative to the nut threaded surface 50, such that at least one thread, and no more than three threads, of the threaded surface is disposed rearward of the rearward facing wall 68 of the flanged base portion.

In an alternative embodiment, as shown in FIG. 5, the post 16 is provided with a locking barb 70 to position the flanged base portion 38 with respect to the threaded surface 50, 50a of the nut 18. Specifically, the locking barb 70 is spaced from the flanged base portion 38 of the post 16 a sufficient distance so that, when the nut 18 is coupled to the connector body 12, the flanged base portion 38 will be positioned within the rear portion 58 of the nut threaded surface 50. In this embodiment, there is no axial movement of the post 16 with respect to the connector body 12.

In either embodiment, it can be appreciated that the maximum outer diameter of the post flanged base portion 38 is slightly less than the smallest inner diameter of the threads of the nut 18. This will permit some axial movement of the flanged base portion 38 with respect to the threaded surface 50, 50a of the nut 18.

The biasing element 62 disposed within the annular chamber 64 acts between the forward facing wall 66 of the nut 18 and the rearward facing wall 68 of the flanged base portion 38 of the post 16 to urge the nut and the post in opposite axial directions. In the embodiment shown in FIG. 5, the biasing element 62 also urges the connector body 12 in the same direction as the post 16. Thus, when a coaxial cable (not shown) is locked within the connector body 12 by the locking sleeve 14, the biasing element 62 will urge the post 16, as well as a forward end of the cable, in the direction of arrow A, toward a signal contact 72 provided in the port connector 48, when the nut 18, 18a is secured thereto.

The biasing element 62 can be a compression spring, a wave spring (single or double wave), a conical spring washer (slotted or unslotted), a Belleville washer, a high durometer O-ring, or any other suitable element for applying a biasing force between the post 16 and the nut 18, 18a, without locking the post to the nut. In other words, the biasing element preferably maintains its biasing force upon disconnection and reconnection of the nut 18 with an external device. The biasing element 62 is provided to further load the interference between the nut threads 50, 50a and the port connector threads 60 and to maintain signal contact between the cable and the port connector 48.

By positioning the flanged base portion 38 of the post 16 within the rear portion 58 of the nut threaded surface 50, and by providing a constant tension biasing element 62 within the annular chamber 64 between the nut 18 and the post 16, the connector 10 of the present invention allows for up to 360 degree "back-off" rotation of the nut 18 on a terminal, without signal loss. As a result, maintaining electrical contact between the coaxial cable connector 10 and the signal contact 72 of the port connector 48 is improved by a factor of 400-500%, as compared with prior art connectors.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A coaxial cable connector for coupling a coaxial cable to an external thread of a mating connector, the connector comprising:

a connector body having a forward end and a rearward cable receiving end for receiving a cable;

a nut rotatably coupled to said forward end of said connector body, said nut having an internally threaded surface for engagement with the external thread of the mating connector, said internally threaded surface having an axial length, an annular post disposed within said connector body, said post having a forward flanged base portion disposed within a rearward extent of said axial length of said internally threaded surface of said nut; and a biasing element acting between said post and said nut.

2. A coaxial cable connector as defined in claim 1, wherein said nut comprises an internal radial flange having a forward facing wall and said flanged base portion of said post includes a rearward facing wall, said forward facing wall of said nut radial flange and said rearward facing wall of said post flanged base portion defining an annular chamber for receiving said biasing element.

3. A coaxial cable connector as defined in claim 2, wherein at least one thread, and no more than three threads, of said nut threaded surface is disposed within said annular chamber rearward of said rearward facing wall of said post flanged base portion.

4. A coaxial cable connector as defined in claim 1, wherein said post comprises a step formed on an outer surface thereof, said step engaging a forward end of said connector body for positioning said post flanged base portion within said axial length of said internally threaded surface of said nut.

5. A coaxial cable connector as defined in claim 1, wherein said flanged base portion of said post has a maximum outer diameter and said internally threaded surface of said nut has a minimal inner diameter, said maximum outer diameter of said post flanged base portion being smaller than said minimal inner diameter of said nut threaded surface, whereby said post flanged base portion is axially movable with respect to said internally threaded surface of said nut.

6. In combination:

a connector terminal including a rearward facing wall and an externally threaded surface; and a coaxial cable connector connected to said connector terminal, said coaxial cable connector comprising:

a connector body having a forward end and a rearward cable receiving end for receiving a cable;

a nut rotatably coupled to said forward end of said connector body, said nut having an internally threaded surface for engagement with said externally threaded surface of said connector terminal, said internally threaded surface having an axial length, an annular post disposed within said connector body, said post having a forward flanged base portion disposed within a rearward extent of said axial length of said internally threaded surface of said nut; and a biasing element acting between said post and said nut to urge a forward facing wall of said post flanged base portion against said rearward facing wall of said connector terminal, wherein said nut is permitted to rotate up to three hundred sixty degrees before said forward facing wall of said post flanged base portion breaks electrical and mechanical contact with said rearward facing wall of said connector terminal.

7. A combination as defined in claim 6, wherein said nut of said connector comprises an internal radial flange having a forward facing wall and said flanged base portion of said post includes a rearward facing wall, said forward facing wall of said nut radial flange and said rearward facing wall of said post flanged base portion defining an annular chamber for receiving said biasing element.

8. A combination as defined in claim 6, wherein at least one thread, and no more than three threads, of said nut threaded surface is disposed within said annular chamber rearward of said rearward facing wall of said post flanged base portion.

9. A combination as defined in claim 6, wherein said post of said connector comprises a step formed on an outer surface thereof, said step engaging a forward end of said connector body for positioning said post flanged base portion within said axial length of said internally threaded surface of said nut.

10. A combination as defined in claim 6, wherein said flanged base portion of said post has a maximum outer diameter and said internally threaded surface of said nut has a minimal inner diameter, said maximum outer diameter of said post flanged base portion being smaller than said minimal inner diameter of said nut threaded surface, whereby said post flanged base portion is axially movable with respect to said internally threaded surface of said nut.

11. A method for reducing the tendency of a coaxial cable connector to loosen itself from a device port, the method comprising the steps of:

providing a device port with a rearward facing wall and an externally threaded surface;

providing a coaxial cable connector with a connector body and a nut rotatably coupled to the connector body, said nut having an internally threaded surface with an axial length;

providing an annular post disposed within said connector body, said post having a forward flanged base portion disposed within a rearward extent of said axial length of said internally threaded surface of said nut;

providing a biasing element acting between said post and said nut; and connecting said connector nut with said device port by rotating said nut in a first direction thereby engaging said externally threaded surface of said port with said internally threaded surface of said connector nut, whereby said biasing element urges said forward facing wall of said post flanged base portion against said rearward facing wall of said port device, whereby said nut is permitted to rotate in a reverse direction up to three hundred sixty degrees before said forward facing wall of said post flanged base portion breaks contact with said rearward facing wall of said port device.

12. A method as defined in claim 11, wherein said biasing element is selected from the group consisting of compression springs, wave springs, conical spring washers, Belleville washers and compressible O-rings.

*13. A coaxial cable connector for coupling a coaxial cable to an external thread of a mating connector, the connector comprising:*

*a connector body having a forward end and a rearward cable receiving end for receiving a cable;*

*a nut rotatably coupled to the forward end of the connector body, the nut having an internally threaded surface for engagement with the external thread of the mating connector, the internally threaded surface having an axial length;*

*an annular post disposed within the connector body, the post having a forward flanged base portion disposed within a rearward extent of the axial length of the internally threaded surface of the nut; and*

*a biasing element configured to apply a biasing force between the post and the nut, at least a portion of the biasing element disposed in an annular chamber defined at least in part by a forward face of the connector body.*

*14. The coaxial cable connector of claim 13, wherein the flanged base portion of the post has a maximum outer diameter and the internally threaded surface of the nut has a minimal inner diameter, wherein the maximum outer diameter of the post flanged base portion is smaller than the minimal inner diameter of the nut threaded surface.*

*15. The coaxial cable connector of claim 14, wherein the nut comprises an internal radial flange having a forward facing wall and the flanged base portion of the post includes a rearward facing wall.*

*16. The coaxial cable connector of claim 15, wherein the post comprises a step formed on an outer surface thereof, the step configured to engage a forward end of the connector body.*

*17. The coaxial cable connector of claim 15, wherein the post comprises a barb formed on an outer surface thereof, the barb configured to engage an inner surface of the connector body.*

*18. The coaxial cable connector of claim 15, wherein the post flanged base portion is axially movable with respect to the internally threaded surface of the nut.*

*19. The coaxial cable connector of claim 18, wherein the nut is permitted to rotate up to three hundred sixty degrees before a forward facing wall of the post flanged base portion breaks mechanical contact with a rearward facing wall of the mating connector.*

*20. The coaxial cable connector of claim 13, wherein the biasing element comprises a spring.*

*21. A coaxial cable connector for coupling a coaxial cable to an external thread of a mating connector, the connector comprising:*

*a connector body having a forward end and a rearward cable receiving end for receiving a cable;*

*a nut rotatably coupled to the forward end of the connector body, the nut having an internally threaded surface for engagement with the external thread of the mating connector;*

*an annular post disposed within the connector body, the post having a forward flanged base portion, wherein the flanged base portion of the post has a maximum outer diameter and the internally threaded surface of the nut has a minimal inner diameter, wherein the maximum outer diameter of the post flanged base portion is smaller than the minimal inner diameter of the nut threaded surface; and*

*a spring in contact with the nut and the post to maintain signal contact between the cable and the mating connector, at least a portion of the spring disposed in an annular chamber defined at least in part by a forward face of the connector body.*

*22. The coaxial cable connector of claim 21, wherein the spring comprises a compression spring.*

*23. The coaxial cable connector of claim 21, wherein the spring applies a biasing force between the post and the nut without locking the post to the nut.*

*24. The coaxial cable connector of claim 23, the forward flanged base portion disposed within a rearward extent of the internally threaded surface of the nut.*

*25. The coaxial cable connector of claim 21, wherein the nut comprises an internal radial flange having a forward facing wall and the flanged base portion of the post includes a rearward facing wall.*

*26. The coaxial cable connector of claim 25, wherein the post comprises a step formed on an outer surface thereof, the step configured to engage a forward end of the connector body.*

*27. The coaxial cable connector of claim 25, wherein the post comprises a barb formed on an outer surface thereof, the barb configured to engage an inner surface of the connector body.*

*28. The coaxial cable connector of claim 25, wherein the post flanged base portion is axially movable with respect to the internally threaded surface of the nut.*

*29. The coaxial cable connector of claim 28, wherein the nut is permitted to rotate up to three hundred sixty degrees before a forward facing wall of the post flanged base portion breaks mechanical contact with a rearward facing wall of the mating connector.*

*30. A coaxial cable connector for coupling a coaxial cable to a mating connector, the connector comprising:*

*a connector body having a forward end and a rearward cable receiving end for receiving a cable;*

*a nut rotatably coupled to the forward end of the connector body, the nut having an internally threaded surface;*

*an annular post disposed within the connector body, the post having a forward flanged base portion, wherein the flanged base portion of the post has an outer diameter and the internally threaded surface of the nut has an inner diameter, wherein the outer diameter of the post flanged base portion is smaller than the inner diameter of the nut threaded surface; and*

*a bias element to maintain a biasing force between the post and the nut upon disconnection and reconnection of the nut with a mating connector, at least a portion of the biasing element disposed in an annular chamber defined at least in part by a forward face of the connector body.*

*31. The coaxial cable connector of claim 30, wherein the bias element comprises a spring.*

*32. The coaxial cable connector of claim 31, wherein the bias element comprises a compression spring.*

*33. The coaxial cable connector of claim 30, the post comprising an annular tubular extension extending rearwardly within the connector body configured to contact a conductor of the coaxial cable, wherein when the coaxial cable connector is coupled to the coaxial cable and the mating connector, the bias element is configured to maintain signal contact between the coaxial cable and the mating connector.*

*34. The coaxial cable connector of claim 30, further comprising a sealing O-ring positioned between the connector body and the nut.*

*35. The coaxial cable connector of claim 30, the forward flanged base portion disposed within a rearward extent of the internally threaded surface of the nut.*

* * * * *